United States Patent [19]
Baldwin et al.

[11] 3,965,213
[45]*June 22, 1976

[54] CONJUGATED DIENE BUTYL

[75] Inventors: Francis P. Baldwin, Summit, N.J.; Alberto Malatesta, Brussels, Belgium

[73] Assignee: Exxon Research and Engineering Company, Linden, N.J.

[ * ] Notice: The portion of the term of this patent subsequent to June 11, 1991, has been disclaimed.

[22] Filed: Apr. 30, 1974

[21] Appl. No.: 465,479

Related U.S. Application Data

[63] Continuation-in-part of Ser. No. 228,727, Feb. 23, 1972, Pat. No. 3,816,371.

[52] U.S. Cl. ............................ 260/879; 260/79.5 C; 260/888; 526/20; 526/30; 526/49; 526/47; 526/56; 526/339
[51] Int. Cl.² ..................... C08L 9/00; C08L 47/00; C08F 279/02; C08K 5/10
[58] Field of Search ................... 260/85.3 R, 85.3 C, 260/79.5 C, 888

[56] References Cited
UNITED STATES PATENTS

3,816,371   6/1974   Baldwin et al. ................ 260/85.3 R

Primary Examiner—Alan Holler

[57] ABSTRACT

Dehydrohalogenation of halogenated butyl to produce a butyl rubber having conjugated double bonds in the linear backbone. The composition is disclosed as having the predominant structure:

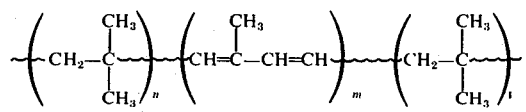

where $n + 1$ represent the number of isoolefin units incorporated in the butyl rubber polymer backbone, and $m$ represents the number of conjugated diolefin units present, substantially as isolated units. The composition is prepared by contacting a solution of halogenated butyl rubber with: (1) a soluble metal carboxylate, where the metal is selected from the metals of Groups Ib, IIb, IVa and VIII of the Periodic Table; (2) a soluble carboxylic acid; and (3) an oxide or hydroxide of a metal selected from the metals of Groups Ia or IIa of the Periodic Table.

14 Claims, No Drawings

CONJUGATED DIENE BUTYL

CROSS-REFERENCE TO RELATED APPLICATION

This application is a continuation-in-part of Ser. No. 228,727, filed Feb. 23, 1972, now U.S. Pat. 3,816,371.

BACKGROUND OF THE INVENTION

1. Field of the Invention

The present invention relates to conjugated diene butyl rubber containing conjugated unsaturation in the linear backbone, and a process of preparing same.

2. Description of the Prior Art

The expression "butyl rubber" is used in the rubber industry to describe copolymers made from a polymerization reaction mixture having therein from 70 to 99.5% by weight of an isoolefin which has about 4 to 7 carbon atoms, e.g., isobutylene, and about 30 to 0.5% by weight of a conjugated multiolefin having from about 4 to 14 carbon atoms, e.g., isoprene. The resulting copolymers contain 85 to 99.5% by weight of combined isoolefin and about 0.5 to 15% of combined multiolefin. The preparation of butyl rubber is described in U.S. Pat. 2,356,128 which is incorporated herein by reference.

The polymer backbone of commercial butyl rubber is made up primarily of isobutylene units, with just a few percent of isoprene units. The isoprene units contribute the small amount of unsaturation present in butyl rubber. The basic preparative equation is represented by:

which combine in the presence of Friedel-Crafts catalysts to form:

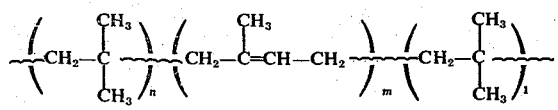

where $n + l$ represent the number of isoolefin units incorporated in the butyl rubber, while $m$ represents the number of initial diolefin units present, substantially as isolated units. The conjugated diolefin, isoprene, loses one olefinic linkage upon its essentially random incorporation into the polymer backbone.

Thus, butyl rubber, as presently produced, contains only a small percentage of unsaturation, in the form of the single double bond associated with the isoprene residue which is incorporated more or less randomly throughout the polymer chain.

Halogenated butyl rubber has been developed in recent years and has contributed significantly to the elastomer business. A method of preparing halogenated butyl rubber is described in U.S. Pat. 3,099,644, which is incorporated herein by reference. Both chlorinated and brominated butyl rubber are well known in the art. The formula for halogenated butyl rubber is typified by:

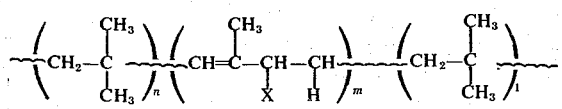

where $n$, $l$ and $m$ have the same values as for butyl rubber, described above, though this structure is but one of several which can be formed, depending on the conditions of halogenation, the halogenating agent used, etc.

SUMMARY OF THE INVENTION

It has now been discovered that dehydrohalogenation of halogenated butyl rubber produces a butyl rubber containing conjugated unsaturation in the linear polymer backbone. The general formula may be represented by:

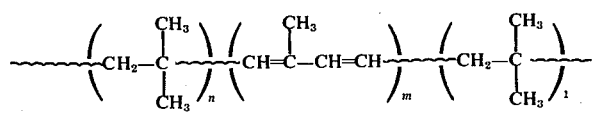

where $n$, $m$ and $l$ have the values previously described, though other structures may be present, for example the structure:

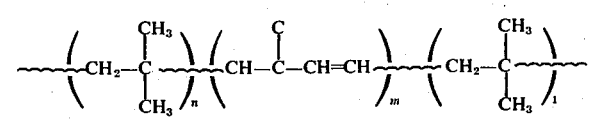

The present invention is directed to a composition of matter comprising a copolymer consisting of from 85 to 99.5% by weight of an isoolefin having from 4 to 7 carbon atoms, combined with 15 to 0.5% by weight of a conjugated diolefin having from about 4 to 14 carbon atoms, containing in the linear polymer backbone conjugated diene unsaturation. Preferably, the composition comprises a copolymer of isobutylene and isoprene, a major portion of the isoprene units combined therein having conjugated diene unsaturation.

DESCRIPTION OF THE PREFERRED EMBODIMENTS

The preferred method of preparing the compositions of the present invention is to dehydrohalogenate a halogenated butyl rubber.

One of the preferred methods of accomplishing this is taught in copending application Ser. No. 228,728, now U.S. Pat. No. 3,775,387, filed on the same day as the parent of this application, by one of the present inventors, Francis P. Baldwin, which application is incorporated herein by reference.

Halogenated butyl rubber is commercially available and may be prepared by halogenating butyl rubber in a solution containing 1 to 60% by weight butyl rubber in a substantially inert $C_5$–$C_8$ hydrocarbon solvent such as pentane, hexane, heptane, etc. and contacting this butyl rubber cement with a halogen gas for a period of about 2–25 minutes. There is then formed the halogenated butyl rubber and a hydrogen halide, the copolymer containing up to one or somewhat more, especially in the case of bromine, halogen atoms per double bond initially present in the copolymer. This invention is not intended to be limited in any way by the manner in which butyl rubber is halogenated or dehydrohalogenated and both chlorinated and brominated butyl rubber are suitable for use in this invention.

Illustrative of halogenated butyl rubber is Enjay Butyl HT 10-68 (a chlorinated butyl rubber which before halogenation analyzes ~1.8 mole % unsaturation and a viscosity-average average molecular weight of about 450,000). However, for the purposes of this invention, it is preferred that the butyl rubber starting material have incorporated therein from about 0.5 to 6% of combined diolefin, more preferably 0.5 to 3%, e.g., about 2%.

Conventional high molecular weight butyl rubber generally has a number average molecular weight of about 25,000 to about 500,000, preferably about 80,000 to about 250,000, especially about 100,000 to about 200,000, and a Wijs Iodine No. of about 0.5 to 50, preferably 1 to 15. More recent low molecular weight polymers are prepared to have number average molecular weights of from 5,000 to 30,000 and unsaturation, expressed as mole percent, of 2–10.

More recently, butyl type polymers have been prepared having unsaturation of about 5 to about 40 wt. %. See, for example, U.S. Pat. 3,808,177 incorporated herein by reference for a detailed description of the polymers and their method of preparation. Hence, the useful polymers of this invention comprise copolymers of about 70 to about 99.5 isoolefins of about 4 to 7 carbon atoms having combined about 0.5 to about 30 weight percent of a conjugated diolefin. The preferred diolefins are isoprene, piperylene, and cyclopentadiene or mixtures thereof. Where the polymer contains more than 1% by weight of combined diolefin, not all of the sites of unsaturation need be halogenated prior to dehalogenation step of the invention. Where desired, however, the polymer may be fully halogenated at all sites of unsaturation. Methods of halogenating or dehydrohalogenating polymers of less than 15% unsaturation are applicable to the more highly unsaturated polymers.

In its preferred embodiment, a major part of the unsaturation of the copolymers of this invention is of the conjugated diene type. However, where the copolymer initially contains more than 1% by weight of combined diolefin, it is not necessary to fully halogenate all sites of unsaturation. In such polymers, it is preferred that about 1 to about 3% by weight of unsaturation is halogenated. Polymers prepared in such a manner may contain after dehydrohalogenation about 2 to about 30% unsaturation from combined initially diolefin which is not of the conjugated diene type. Preferably, where the polymer comprises about 0.5 to about 3% by weight combined diolefin, all of the unsaturation is halogenated and subsequently dehydrohalogenated to produce a copolymer with a major part of their unsaturation of the conjugated diene type. The term "substantially all" as used in the specification and claims means about 99% or more.

Dehydrohalogenation is a known chemical reaction and reagents commonly used are listed, for example, on p. 1308 of "Reagents for Organic Synthesis" by Louis F. and Mary Fieser (John Wiley and Sons, Inc., New York, 1967). Among these are, for example, t-butylamine, N,N-dimethylformamide, calcium carbonate, potassium t-butoxide, sodium iodide in 1,2-imethoxyethane, etc.

These methods and reagents have been employed with low molecular weight materials where homogeneous contacting of the material to be dehydrohalogenated with the dehydrohalogenating reagent is effected at high concentration, where compound and reagent solubilization can be effected by the use of polar solvents, e.g., dimethylsulfoxide, ethanol, diethyl ether, etc.

In high polymers where the halogen is present in the polymer only in small percentage, where the polymer is not soluble in polar solvents and where the concentration of the halogen containing polymer is limited by the high viscosity of polymer solutions in solvents, these methods of dehydrohalogenation are not suitable for producing the compositions of the present invention. Moreover, even in the case where the dehydrohalogenating reagent is hydrocarbon soluble, undesirable side reactions occur, which prevents formation of the products of this invention.

For example, dehydrohologenation by tertiary amines can be considered conventional. The side reaction here is the formation of quaternary salts as in reaction 1

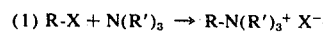

where X = halogen.

These salts when embedded in a medium of low dielectric constant (i.e., the polymer itself) lead to associated ionic complexes. In a high polymer this manifests itself in pseudo crosslinking leading to enormous increases in viscosity and gelation.

In summary then the most effective conventional reagents are insoluble in the systems of concern, and the soluble conventional reagents give undesirable side reactions.

A particularly advantageous method of preparing these polymers comprises heating a solution of the halogenated polymer in the presence of a soluble metal carboxylate. Suitable metals are the polyvalent metals of Groups Ib, IIb, IVa and VIII, of the Periodic Table, having a relatively high first ionization potential and whose halides are soluble in the hydrocarbon reaction medium at the reaction temperature. Typical of these are zinc, iron, mercury, nickel, copper, tin and cadmium carboxylates.

Especially useful are the soluble carboxylic acid salts of zinc (e.g., zinc salts of naphthenic acids). While useful in preparing the compositions of the present invention, potential toxicity problems which could be encountered in practicing the present invention might limit the use of certain metals, such as cadmium and mercury salts, for example.

Zinc carboxylate is the most preferred catalyst in the present invention. However, in dehydrohalogenating the halogenated butyl rubber, according to the present invention, zinc chloride is thought to be a by-product in the reaction. Zinc chloride, being an effective Friedel-Crafts type catalyst, may lead to molecular weight degradation or crosslinking of the halogenated polymers, depending on the structure of the polymer.

This difficulty is overcome, in the present invention, by having present in the reaction zone a metal oxide, hydroxide or carboxylate whose halogen salt is insoluble in the reaction medium.

For example, although not wishing to be bound thereby, it is thought that the invention proceeds by the following series of reactions:

i. Dehydrohalogenation by Zinc Carboxylate (2) 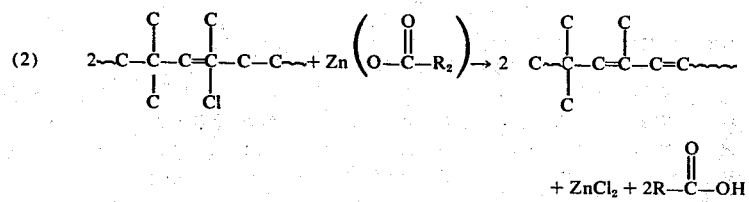

ii. Generation of Alkali or Alkaline Earth Carboxylate (3) 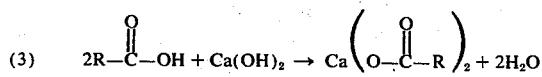

iii. Regeneration of Zinc Carboxylate and Elimination of Zinc Halide (4) 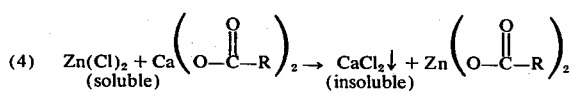

Thus, by this series of reactions the zinc carboxylate, effective in dehydrohalogenation, perhaps by a concerted 6-membered ring mechanism route as depicted below:

(5) 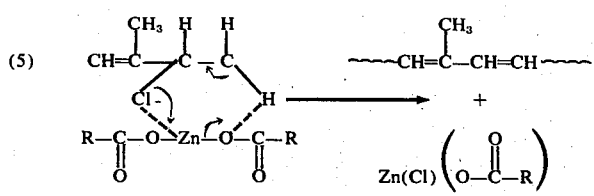

can be regenerated, the net overall reaction in terms of transformation of materials being (6) 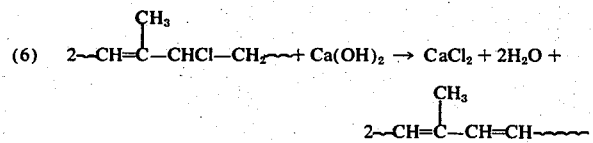

It has also been observed that reaction 2 (or 5) does not occur exclusively. In such reactions there is thought to be competition between the elimination and the substitution routes, the former producing the conjugated diene containing polymer, the latter an allylic ester containing polymer as indicated below.

(7) 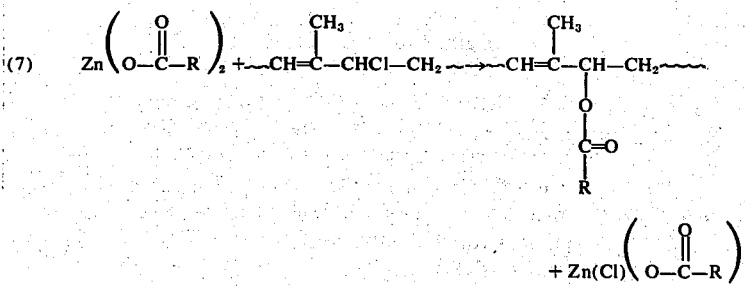

For the purpose of this invention, reaction 7 must be repressed.

The relative participation of reactions 2 (or 5) and 7 can be adjusted by the solvent medium used, the temperature at which the reaction is run and other factors known to alter the competition between elimination and substitution reactions. The exact nature of the allylic halide present in the polymer will also influence the relative extents of the two reactions under a given set of conditions. Not all of the factors governing the ratio of the reactions effected can be set forth, but we can and do illustrate that the balance can be effected in some of the examples to be cited.

It has been found that the mole percent of conjugated diene unsaturation, in the products of this invention, run from about 0.5 to about 2.5. The mole percent of allylic ester is generally from about 0.1 to 0.25.

The conjugated diene-containing butyl rubber of this invention may be cured by a variety of methods, e.g., sulfur, sulfur-containing curing agents, polyfunctional dienophiles, and the like. Typical polyfunctional dienophiles are m-phenylene-bis-maleimide; ethylene glycol dimethacrylate; trimethylol propane trimethacrylate. Monofunctional dienophiles suitable for further modification of the polymer are cis-2-butene diol; maleic anhydride; vinyl trichlorosilane; allyl alcohol; acrylic acid; crotonaldehyde; and the like. These are merely well known examples. There are many more polyfunctional dienophiles, well known in the art, that will cure the present compositions.

In addition, the known sulfur and sulfur-containing curing agents may be used to cure the present compositions.

The conjugated diene-containing compositions may also be covulcanized with other general purpose rubbers. Most suitable are the high unsaturation rubbers, such as natural rubber, SBR (a butadiene styrene rubber known formerly as GR-S) and the like. This is demonstrated in Example 8, hereinbelow. The amount of high unsaturation rubber that can be blended with the conjugated diene rubber of this invention is from about 10 to 90 weight percent.

The product of this invention will be more completely understood in reference to the following examples.

EXAMPLE 1

A one liter glass, vapor jacketed reactor, fitted with stirrer and reflux condenser or reactor and jacket, was charged with 50 grams of a chlorinated butyl rubber (Chlorobutyl HT-1068, manufactured by Enjay Chemical Company), 4 g. zinc naphthenate, 0.5 g. naphthenic acid, and 3 g. powdered lime (CaO). The zinc naphthenate, naphthenic acid and CaO were added after the rubber was dissolved. The reactor was then blanketed with nitrogen.

The vapor jacket, also charged with xylene, was then brought to reflux leading to a reactor temperature of about 138°C. After 0.5, 1, 2 and 4 hours of heating, 75 ml. samples were withdrawn from the reactor, placed in centrifuge tubes, diluted with approximately 30 ml. of hexane and centrifuged.

The clear fluid in the tubes was then slowly poured into rapidly agitated acetone to precipitate the polymer. The precipitate was then stored for 12 hours under 200 ml. acetone containing 0.2 g. of an antioxidant. The polymer was dried in a vacuum oven at about 50°C. for 16 hours.

Samples were submitted for chlorine analysis, the results of which are in Table I.

TABLE I

| Sample | CHLORINE ANALYSIS Reaction Time, Hrs. | % Cl | % Cl Removed |
|---|---|---|---|
| A | 0 | 1.14 | 0 |
| B | 0.5 | 0.24 | 78.8 |
| C | 1.0 | 0.21 | 81.5 |
| D | 2.0 | 0.14 | 87.6 |
| E | 4.0 | <0.06 | >95 |

The material remaining in the reactor, which was allowed to cool to ambient temperature after 4 hours of heating at 138°C., was removed from the reactor and diluted with about 600 ml. hexane, the solids settled by gravity and the polymer contained in the clear supernatant fluid precipitated in acetone. The precipitate (designated Sample F) was treated in the same manner as the withdrawn samples in Table I.

After drying, the Sample F was compounded as follows:

| Polymer Sample F | 100 parts |
|---|---|
| m-phenylene-bis-maleimide | 4.5 |

A sample of this material was placed in a mold in a curing press for 60 minutes at 100°C. On removal of the crosslinked vulcanizate, a sample was immersed in cyclohexane. At equilibrium the sample exhibited a swelling ratio (wt. of sample + wt. of solvent/wt. of sample) of 3.62, indicating a highly crosslinked network.

Drying and reweighing of the swollen sample indicated insolubilization of greater than 96% of the polymer.

EXAMPLE 2

A 100 gallon, jacketed, glass-lined, stirred Pfaudler reactor was charged with:
1. 55 gallons of xylene
2. 53 pounds of diced Enjay Butyl HT 1068
3. 2 pounds of diced Butyl HT 1068 into which had been milled 275 grams of magnesium oxide
4. 150 grams of naphthenic acid analyzing 220 g./mole COOH
5. 860 grams of zinc naphthenate
6. 25 grams of Antioxidant 2246

The reactor was then heated to 132°–134°C. under nitrogen and held at this temperature for 4 hours. When the reactor had cooled, the polymer was precipitated from solution by the addition of 55 gallons of 99% isopropanol.

The supernatant fluid was then siphoned off and the precipitated polymer redissolved in 55 gallons of hexane and the polymer reprecipitated with ispopropanol.

Again the supernatant fluid was siphoned off and the polymer redissolved in 450 pounds of hexane. To this solution were added 37.5 g. Antioxidant 2246 and the solution was then washed with 25–30 gallons of cold water. After settling, the water was drawn off, 250 grams of finely powdered calcium stearate added and the cement drummed.

The polymer was then collected by boiling off the hexane in a steam/water bath, complete drying being effected by milling on a hot (~300°F.) open rubber mill.

The analytical data obtained are as follows:

|  | Feed Polymer | Reaction Product |
|---|---|---|
| % Cl | 1.14 | 0.09 |
| Dimer Solution |  |  |
| Viscosity Ratio (0.5/1)* | 0.805/0.747 | 0.806/0.746 |
| Iodine Number | 7.1 | 12.2 |

*Indicates solution concentrations, mg polymer/ml. isobutylene dimer.

showing that the chlorine had been effectively removed, the iodine number increased and no molecular weight breakdown occured.

Infrared and ultraviolet analyses, respectively, indicated the product contained:
mole % allylic ester - 0.034
mole % conjugated diene - 1.37

A sample of this polymer when mixed with 4.50 grams of m-phenylene-bis-maleimide per 100 grams of polymer and heated in a mold for 2 hours at 275°F. displayed a swelling ratio in cyclohexane (as defined in Example 1) of 4.17.

EXAMPLE 3

The reactor as described in Example 2 was charged with:
1. 55 gallons of xylene
2. 53 pounds of diced Enjay Butyl HT 1068.
3. 2 pounds of HT 1068 into which had been milled 400 grams of calcium hydroxide
4. 100 grams of naphthenic acid
5. 860 grams of zinc naphthenate
6. 12.5 grams of Antioxidant 2246

The reaction was conducted as before (4 hrs. at ~134°C.) and the polymer precipitated twice as before. However, the final solution was washed with ~25 gallons of water containing 1 pound of glacial acetic acid and ~3 gallons of 99% isopropanol. This dissolved all unreacted calcium hydroxide and caused rapid settling of the water layer.

The polymer was collected as before by solvent flashing and hot milling.

Analytical data on this run are as follows:

|  | Feed Polymer | Reaction Product |
|---|---|---|
| % Cl | 1.12 | 0.05 |
| Dimer Solution Viscosity Ratio (0.5/1) | 0.803/0.746 | 0.809/0.749 |
| Iodine Number | 7.36 | 11.8 |

Spectral examination indicated the reaction product to contain 0.119 mole % allylic ester and 1.24 mole % conjugated diene. Curing and swelling as in Example 2 gave a swell ratio of 3.80.

EXAMPLE 4

In the procedure much as that used in Example 3, an error was made and only 60 grams of calcium hydroxide was added to the reactor. After reaction, the xylene solution was very thin indicating drastic reduction in the molecular weight of the polymer. This example then reveals the effect of insufficient group IIa metal hydroxide to forestall accumulation of zinc chloride.

EXAMPLE 5

To a vapor jacketed 1 liter glass reactor equipped with stirring paddle were added:
1. 200 ml xylene
2. 50 grams of a low molecular weight chlorinated butyl
3. 1.5 grams of naphthenic acid
4. 4 grams of zinc naphthenate
5. 3 grams of calcium hydroxide After the polymer had dissolved, the jacket (containing xylene) was brought to reflux and reflux maintained for 4 hours. When the reactor had cooled, the solution was diluted with 200 ml. hexane and washed with 175 ml. water containing 10 ml. glacial acetic acid and 75 ml 99% isopropanol.

The wash water was drawn off in a separatory funnel, the solution evaporated on a steam bath by bubbling nitrogen through the hot solution until the total volume was about 225 ml. This solution was then poured into acetone, mulled around by hand and the supernatant fluid poured off. The polymer was then stored under fresh acetone for a few days and finally dried in a vacuum oven at 50–55°C. for ~22 hrs.

Analytical data are as follows:

|  | Feed Polymer | Reaction Product |
|---|---|---|
| % Cl | 2.85 | 0.19 |
| Dimer Solution Viscosity Ratio (2/1) | 0.790/0.749 | 0.793/0.746 |

When 5 grams of this polymer were mixed by hand with 0.35 grams of 94% m-phenylene-bis-maleimide gelation was noticeable after 8 hours standing at room temperature and extensive crosslinking had occured after a few days' storage. After several weeks the vulcanizate displayed a swelling ratio in cyclohexane of 6.00 and 88.6% of the polymer had been insolubilized.

The compositions of this invention may be cured with conventional curing systems. However, it has been discovered that the conventional accelerators, normally used with high unsaturated rubber such as Natural rubber, SBR, and the like, cause the present compositions to be cured at essentially the same rate as with the so-called "ultra accelerators".

Thus, in the following example, there is demonstrated the curability of the conjugated diene containing butyl rubber of this invention.

EXAMPLE 5

A masterbatch of conjugated diene containing butyl rubber referred to hereinafter as CDB, was prepared in a conventional manner, with a variety of accelerators, shown in Table II, below. The CDB was prepared in the same manner as in Example 1, above, and analyzed a mole percent conjugated unsaturation of ~1.19; and had a Wijs Iodine No. of 10.4.

The masterbatch contained (in parts by weight):

| CDB | 100.0 |
|---|---|
| SRF Black | 50.0 |
| ZnO | 5.0 |
| Stearic Acid | 2.0 |
| Sulfur | 2.0 |
| Px-441[2] | 1.0 |

TABLE II

CDB ACCELERATOR TESTS

| Run No. | Accelerator(phr) Cure, Min.at 290°F. |  | Swelling Ratio[1] |  |  |  |
|---|---|---|---|---|---|---|
|  |  |  | 20 | 40 | 80 | 160 |
| 5.1 | Ethyl Tuads | (1.0) | 6.99 | 3.77 | 2.98 | 2.94 |
| 5.2 | Tellurac | (1.0) | 3.98 | 3.23 | 2.84 | 2.90 |
| 5.3 | Santocure | (1.0) | 3.74 | 3.23 | 2.94 | 2.93 |
| 5.4 | Santocure | (2.0) | 3.80 | 3.25 | 3.00 | 2.96 |
| 5.5 | Captax | (1.0) | 7.19 | 5.56 | 3.64 | 3.36 |
| 5.6 | Butyl Zimate | (1.0) | 6.61 | 4.43 | 3.20 | 3.18 |

[1]Swelling ratio described in Example 1.
[2]Px-441 is di(tert. butyl)-p-cresol.

The low swell ratio values shown in Table II indicate relative high crosslink density. Most interesting is the fact that the so-called "ultra accelerators", e.g. Run Numbers 5.1, 5.2 and 5.6, cause curing at about the same rate as the accelerators normally used with high unsaturated rubber, i.e. Run Number 5.3, 5.4 and 5.5.

EXAMPLE 6

Runs were made to obtain a comparison of CDB curing time with the curing time for other rubber compounds. Used in these runs was a butyl rubber and a commercial SBR rubber. The rubber was compounded as follows, and the compounds cured for 20 minutes at 290°F.

TABLE III

| Run Number | 6.1 | 6.2 | 6.3 |
|---|---|---|---|
| CDB | 100 | — | — |
| Butyl 218 | — | 100 | — |
| SBR 1500 | — | — | 100 |
| SRF Black | 50 | 50 | 50 |
| ZnO | 5 | 5 | 5 |
| Sulfur | 1.6 | 1.6 | 1.6 |
| Santocure | 1.2 | 1.2 | 1.2 |
| Tensile-Elongation[1] |  |  |  |
| Stress at 300% Elongation |  |  |  |
| Cured 20'/290°F. | 2000–790 550 | no cure | no cure |

[1]Tests run with micro dumbbells.

All the ingredients are in parts by 100 parts by weight of the rubber.

EXAMPLE 7

A particular advantage of the present CDB compositions is their ability to cure at high temperatures without reversion. Curing rubber at high temperatures, e.g.

340°F. and higher, using conventional sulfur-accelerator packages, frequently leads to the phenomena of reversion, wherein suitable crosslink densities can neither be attained or maintained on continued heating at these temperatures. By contrast, curing the CDB polymers of this invention with polyfunctional dienophiles is effectively conducted at these higher temperatures. The resulting network has no tendency to degrade on continued heating.

In order to illustrate this, a CDB, prepared in essentially the same manner as the CDB of Example 1, was cured with two polyfunctional dienophiles. The conditions and swell ratio are given in Table IV below. The CDB analyzed 0.04% chlorine, had a conjugated diene content of 1.39 mole % and an Iodine No. of 12.0 (compared to an initial Iodine No. of 6.1 in the chlorinated butyl, Enjay HT 1068).

TABLE IV

| Run No. | 7.1 | 7.2 | 7.3 | 7.4 | 7.5 |
|---|---|---|---|---|---|
| CDB | 100.0 | 100.0 | 100.0 | 100.0 | 100.0 |
| SR 207[1] | — | 2.1 | 4.2 | — | — |
| SR 350[2] | — | — | — | 2.1 | 4.2 |
| Swell Ratio (% Soluble)[3] | | | | | |
| Cured 30'/320°F. | ∞ (100) | 14.4(17.8) | 13.4(14.1) | 8.4(8.2) | 7.3(7.0) |
| 30'/340°F. | Slight gel | 9.4(9.6) | 9.2(7.4) | 7.0(5.1) | 6.5(5.2) |
| 30'/360°F. | 34.0(40.0) | 6.7(4.8) | 6.7(4.8) | 5.7(3.4) | 5.6(4.2) |
| 30'/380°F. | 21.8(15.6) | 6.3(4.2) | 6.2(3.6) | 5.4(2.9) | 5.5(3.9) |

[1] Ethylene glycol dimethylacrylate  
[2] Trimethyl propane trimethacrylate  
Concentration levels used are 1 and 2 functional groups per conjugated diene grouping, respectively.  
[3] Solvent — cyclohexane  
NOTE: The parts of ingredients are on a phr basis.  
The low swell ratios indicate a high crosslink density.

EXAMPLE 8

Blends of CDB with other elastomers may be covulcanized to produce rubber compounds having interesting properties. It was found in this case that better physical properties were obtained by compounding the CDB and other elastomer separate, followed by blending. This is opposed to a method where the rubber is blended on a mill, followed by addition of the cure package. This is illustrated in Table V, below, where Runs 8.1 and 8.2 are the two masterbatch preparations with the individual rubbers, CDB, and SBR-1500, respectively. Runs 8.3-8.5 are blends of these masterbatch preparations. Run 8.6 was prepared by blending the two rubbers, followed by addition, on the mill, of the black, oil, and cure package.

ASTM Dumbbell specimens were used to determine tensile, elongation, and stress at 300% elongation. Swelling ratio was determined as described in Example 1, with toluene used as the solvent.

The CDB was prepared in the same manner as in Example 1, the sample having a mole percent conjugated diene unsaturation of ~1.02.

The preparation of butyl rubber type polymers containing randomly distributed conjugated diene func-

TABLE V

| Run No. | \multicolumn{6}{c}{CDB/SBR COVULCANIZATION} |
|---|---|---|---|---|---|---|
| | 8.1 | 8.2 | 8.3 | 8.4 | 8.5 | 8.6 |
| CDB | 100.0 | — | 25.0 | 50.0 | 75.0 | 75.0 |
| SBR-1500 | — | 100.0 | 75.0 | 50.0 | 25.0 | 25.0 |
| Tensile-Elong. | | | | | | |
| Stress at 300% E | | | | | | |
| Swell Ratio | | | | | | |
| Cured 20'/290°F. | 1800–790 | 125–890 | 790–865 | 1190–735 | 1075–640 | 325–730 |
| | 400 | 100 | 270 | 410 | 500 | 225 |
| | 4.32 | 7.16 | 5.60 | 4.32 | 4.06 | 5.26 |
| 40'/290°F. | 2550–640 | 2225–525 | 2450–585 | 1700–440 | 1725–515 | 1325–485 |
| | 950 | 800 | 1020 | 1100 | 950 | 875 |
| | 3.24 | 3.77 | 3.30 | 3.17 | 3.19 | 3.38 |
| 80'/290°F. | 2700–515 | 2800–535 | 2475–465 | 1850–400 | 1875–450 | 1550–425 |
| | 1400 | 1350 | 1450 | 1375 | 1200 | 1125 |
| | 2.72 | 3.13 | 2.84 | 2.83 | 2.80 | 2.87 |

NOTE: All runs were compounded with the following package of materials; amounts are on a phr basis: Philblack 0 — 50.0; Flexon 580 — 10.0; ZnO — 5.0; Stearic Acid — 1.5; Sulfur — 1.75; Santocure — 1.0.

tionality prepared by dehydrohalogenation of an allylically halogenated copolymer of isobutylene and isoprene have been described herein. The structures of the conjugated diene units are thought to be two as depicted below:

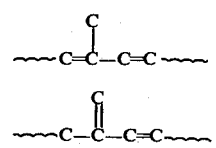

Additionally, structure (1) can exist in cis, cis; cis, trans; trans, cis; trans, trans configurations. Similarly in structure (2) the internal double bond can be either cis or trans.

By proper choice of the butyl employed in halogenation, it is possible to alter the structure of the conjugated diene units and by this means adjust their reactivity in reactions involving conjugated diene chemistry.

For example, starting with a butyl type polymer prepared from dimethyl butadiene and isobutylene, on halogenation the structures produced are (X=halogen):

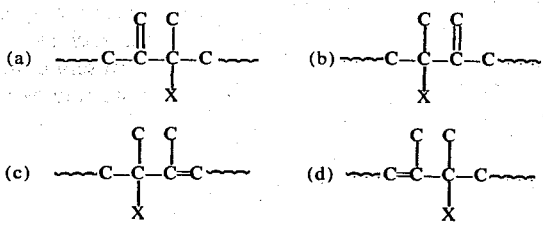

Dehydrohalogenation of (a) leads to:

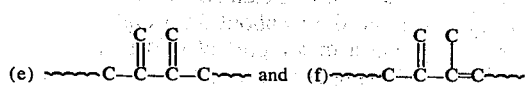

and of (b) to:

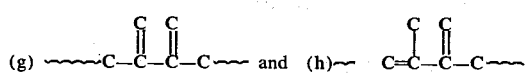

while dehydrohalogenation of (c) gives:

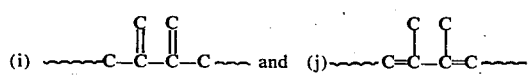

and of (d) gives:

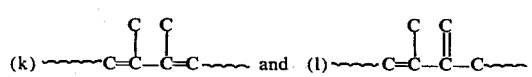

It will be noted that structures (e), (g) and (i) are identical and all of the double bonds are outside the main chain. Such a structure leads to a very high level of reactivity with dienophiles, for example. Structure (f) is produced only in one way. Structures (h) and (l) are identical. In these structures (f, h, l), one double bond is in the main chain while one is outside. structures (j) and (k) are identical and here both double bonds are in the main chain. Thus, material prepared from 1,4 enchained dimethylbutadiene/isobutylene copolymers exhibit 4 basic conjugated diene structures.

Another structure is derived from preparation of the polymer containing conjugated diene from an allytically halogenated copolymer of isobutylene and cyclopentadiene.

Cyclopentadiene can enchain both by 1,4 and 1,2 additions leading to the structures:

(m) 

and (n) 

On allylic halogenation one would have the structures:

(o) 

or (p) 

derived from structure (m) and (q) 

or (r) 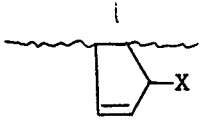

On dehydrohalogenation of structures (o) and (p), the structures produced are:

(s) , (t) 

or (u) 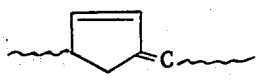

while dehydrohalogenation of structures (q) and (r) results in:

(v) 

or (w) 

The substituted cyclopentadiene structures are extremely reactive in the reaction with dienophiles because of the added thermodynamic driving force of relief from ring strain. Indeed, such polymers tend to spontaneously crosslink the one diene acting as the dienophile for the other. It is well known that cyclopentadiene and its alkyl-substituted derivatives (e.g., methyl cyclopentadiene) dimerize readily.

Thus, by the proper selection of the diene used to prepare the original copolymer coupled with the method of halogenation of that polymer, dehydrohalogenation can lead to conjugated diene structures in which the individual olefinic units are:
1. both in the main backbone chain
2. both outside the backbone chain
3. one inside and one outside the backbone chain
4. both present in a ring
5. one inside the ring and one outside the ring Each of these structures and their mixtures in any given polymer will regulate the reactivity of the polymer in terms of reactions such as vulcanization, Diels-Alder coupling reactions, polymerization, etc.

The term "conjugated diene groups" as used in the specification and claims means the types of conjugated diene structures described above.

The term "sulfur donor" as used in the specification and claims means sulfur, sulfur containing curing agents or sulfur in combination with sulfur containing curing agents. Illustrative of sulfur containing curing agents are tetramethyl thiuram disulfide, di-pentamethylene thiuram tetrasulfide, di-morpholyl disulfide, sulfur chloride, etc.

Of course, in conjunction with sulfur donors, one can incorporate those compounds shown to enhance sulfur cures of unsaturated elastomers into the compositions. Illustrative of such compounds are ZnO, fatty acids, e.g. stearic acid, diphenyl quanidine, 2-mercaptobenzothiazole, benzothiazyl-2-N-dithiomorpholide, zinc dithiocarbonate, etc.

What is claimed is:

1. A composition of matter consisting essentially of a copolymer consisting of about 70 to about 99.5% by weight of an isoolefin having about 4 to about 7 carbon atoms and about 30 to 0.5% by weight of at least one conjugated diolefin having about 4 to about 14 carbon atoms, said copolymer having conjugated diene groups and a number average molecular weight of about 5,000 to about 500,000.

2. The composition of claim 1 wherein the conjugated diolefin is selected from the group consisting of isoprene, piperylene, dimethyl butadiene, cyclopentadiene methyl cyclopentediene or mixtures thereof.

3. The composition of claim 2 wherein the diolefin is isoprene.

4. The composition of claim 2 wherein the diolefin is a mixture of isoprene and cyclopentadiene.

5. The composition of claim 3 wherein the copolymer comprises about 0.5 to about 3.0 weight percent combined isoprene a major part of said incorporated isoprene units having been converted to conjugated diene configurations.

6. The composition of claim 1 wherein a sulfur donor is incorporated therein.

7. The composition of claim 1 cured with a sulfur donor.

8. The composition of claim 1 cured with a polyfunctional dienophile.

9. The composition of claim 8 wherein the dienophile is m-phenylene-bis-maleimide, ethylene glycol dimethacrylate or trimethylol propane trimethacrylate.

10. The composition of claim 1 covulcanized with about 10 to about 90 percent by weight of a high unsaturation rubber.

11. The composition of claim 10 wherein the high unsaturation rubber is natural rubber or SBR.

12. The composition of claim 1 wherein the copolymer comprises about 85 to about 99.5% by weight of isoolefin and about 15 to about 0.5% by weight of conjugated diolefin.

13. The composition of claim 1 modified by reaction with a monofunctional dienophile.

14. The composition of claim 13 wherein the dienophile is acrolein, alkyl esters of acrylic acid or acrylic acid.

* * * * *